US007509659B2

(12) United States Patent  
McArdle

(10) Patent No.: US 7,509,659 B2
(45) Date of Patent: Mar. 24, 2009

(54) PROGRAMMING PORTAL APPLICATIONS

(75) Inventor: James M. McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 10/992,523

(22) Filed: Nov. 18, 2004

(65) Prior Publication Data

US 2006/0168595 A1  Jul. 27, 2006

(51) Int. Cl.
 *G06F 9/44* (2006.01)
(52) U.S. Cl. .................................. 719/328; 719/323
(58) Field of Classification Search .............. 719/313, 719/328, 310, 311, 321, 323; 709/201, 219
 See application file for complete search history.

(56) References Cited

U.S. PATENT DOCUMENTS

| | | | |
|---|---|---|---|
| 5,935,249 A | 8/1999 | Stern et al. ................... 713/201 |
| 6,304,898 B1 | 10/2001 | Shiigi | |
| 6,564,249 B2 * | 5/2003 | Shiigi ........................ 709/206 |
| 6,564,250 B1 | 5/2003 | Nguyen ...................... 709/208 |
| 2002/0026500 A1 * | 2/2002 | Kanefsky et al. ............ 709/219 |
| 2002/0188661 A1 | 12/2002 | Casais ........................ 709/202 |
| 2003/0009392 A1 | 1/2003 | Perkowski ................... 705/26 |
| 2003/0110448 A1 * | 6/2003 | Haut et al. ................... 715/513 |
| 2003/0195976 A1 * | 10/2003 | Shiigi ......................... 709/230 |
| 2003/0204377 A1 | 10/2003 | Royal, Jr. et al. ............ 702/188 |
| 2004/0019625 A1 | 1/2004 | Higuchi ...................... 709/201 |
| 2004/0027375 A1 | 2/2004 | Ellis et al. ................... 345/753 |
| 2004/0073713 A1 | 4/2004 | Pentikainen et al. ........ 709/249 |
| 2004/0086095 A1 | 5/2004 | Dixit et al. ............... 379/88.17 |

OTHER PUBLICATIONS

Weber et al., *Method and Apparatus for Local Client Processing of Java Applet Server Data*, 2000.

* cited by examiner

*Primary Examiner*—Van H Nguyen
(74) *Attorney, Agent, or Firm*—Libby Z. Handelsman; Gregory K Goshorn; Greg Goshorn, P.C.

(57) ABSTRACT

Provided is a method for enabling dynamic graphical interfacing with a server from a client. A method includes receiving at a portlet, a plurality of user-generated drawing location identifiers, mapping the user-generated drawing location identifiers to an Applet function via an Applet application programming interface (API), and generating a drawing using a drawing method with the user-generated drawing location identifiers. After the drawing is generated a drawing is returned to a user associated with the user-generated drawing location identifiers. The user-generated drawing location identifiers can be one or more of mouse clicks, taps, and tablet PC drawing indications via a pen. The portlet enables a graphical interface via the Applet API and the Applet API is stored in a Java Archive file (JAR). The JAR file enables multiple users to view the drawing without requiring local files.

1 Claim, 3 Drawing Sheets

PROGRAMMING PORTAL APPLICATIONS

TECHNICAL FIELD

The present invention relates generally to programming code and, more specifically, to a method for programming portal applications using a Java Applet application programming interface (API).

BACKGROUND OF THE INVENTION

Java Applets have been known in the computer programming industry since Java programming began in 1995. Java applets typically have been deployed from websites to operate with a user's browser application independent of a user's local files. The popularity of Java Applets continued due to the relative ease with which a programmer could write code with, for example only five primary methods that required coding. Java Applets have been superceded by more robust and complex programming modules, such as servlets, Java Server Pages (JSPs) and portlets. A servlet is an extension to a server that enhances the server's functionality. The most common use for a servlet is to extend a web server by providing dynamic web content. They are programs that run on a Web server and build Web pages. A servlet enables building Web pages on the fly. Building Web pages quickly is useful because a Web page can be based on data submitted by the user. Also, data changes frequently and page might build the page dynamically to enable current information to be viewed. Java Server Pages (JSP) is a technology that lets you mix regular, static HTML with dynamically-generated HTML. Many Web pages that are built by CGI programs are mostly static, with the dynamic part limited to a few small locations. But most CGI variations, including servlets, make you generate the entire page via your program, even though most of it is always the same. A JSP allows creating the two parts separately.

A portlet is a reusable Web component that displays relevant information to portal users. Portlets can be used, for example, to implement email, weather, discussion forums and news. Portlet standards enable developers to create portlets that can be used for in any portal supporting the standards.

A problem with portlets, servlets and the like is that there are functions that are difficult to implement on a server, such as the ability to create a graphic dynamically using the standard graphic methods such as drawRect and the like and thereafter encode the graphic into a jpg file or the like. Portlets and servlets do not allow efficient storage such that a Web server can easily locate such a file. Current methods do not easily allow such a file to be dynamically created or allow multiple concurrent users using a same portlet to access such a file. Thus, there is a need for portal applications to be implemented with techniques that would allow programmers to more easily write graphic-based applications that can run within a portal server.

SUMMARY OF THE INVENTION

Provided is a system and method for providing end users with the ability to write package and upload programs to run within their own portal environment on a portal server that is sharable with other end users. The programs are implemented as applets and packaged as Java Archive (JAR) formatted files that can be restricted to writing files with a workspace of a limited size to access any hosted database if proper access is granted. According to an embodiment, the programs can create image content on a server as either a .jpg file or as a scaleable vector graphics type file that can be displayed on an end users portal. In one embodiment, mouse clicks can be converted to SOAP messages or action URLs sent back to the program as mouse coordinates to be used for generating new images.

BRIEF DESCRIPTION OF THE DRAWINGS

A better understanding of the present invention can be obtained when the following detailed description of the disclosed embodiments is considered in conjunction with the following drawings, in which.

DETAILED DESCRIPTION OF THE FIGURES

Figure 1:
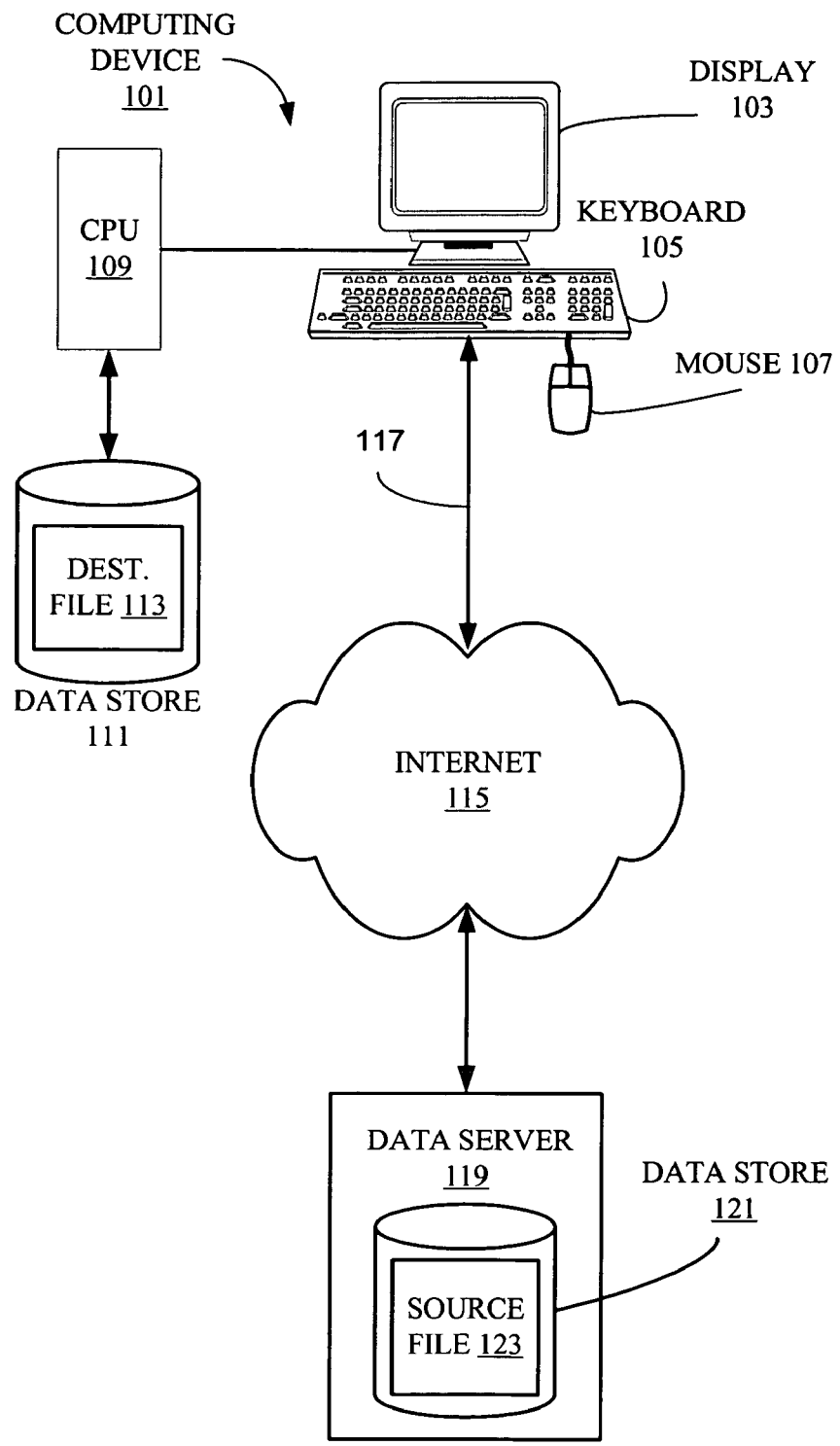
FIG. 1 is a block diagram of an exemplary system architecture that supports the claimed subject matter.

Although described with particular reference to programming languages, the system and method of the current invention can be implemented for any interpreted language, such as a spoken language and the like. FIG. 1 illustrates an exemplary architecture 100 in which the system according to the present invention is implemented. Those with skill in the computing arts will recognize that the disclosed embodiments have relevance to a wide variety of applications and architectures in addition to those described below. In addition, the functionality of the present invention can be implemented in software, hardware, or a combination of software and hardware. The hardware portion can be implemented using specialized logic; the software portion can be stored in a memory or recording medium and executed by a suitable instruction execution system such as a microprocessor.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

FIG. 1 is a block diagram of an exemplary system architecture 100 that supports the claimed subject matter. System 100 includes a computing device 101, which in this example is a personal computer (PC). Attached to PC 101 are a display 103, a keyboard 105, and a mouse 107. Display 103, keyboard 105 and mouse 107 provide a user with means to interact with PC 101. Also included in PC 101 are a central processing unit (CPU) 109 and a recording medium, or data store 111. Those with skill in the computing arts should be familiar with PC 101 and related components 103, 105, 107, 109 and 111.

PC 101 is connected to the Internet 115 via a connection 117. Also coupled to Internet 115 is a data server 119 with a data store 121. A user of PC 101 can access various information sources, such as a source file 123 on data store 119, via Internet 115.

PC 101 can be configured to be a Web server that processes requests from a client application or can be configured as a client that sends requests to a connected Web server.

Figure 2:
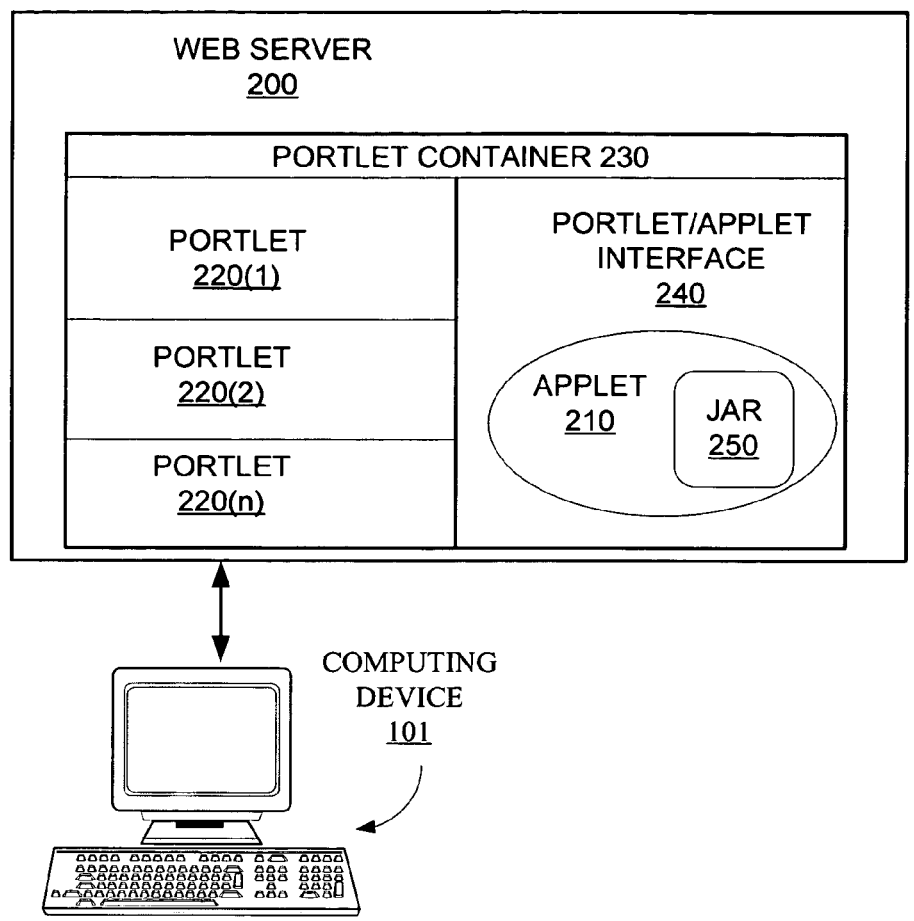
FIG. 2 is a block diagram of a portal server system that supports the claimed subject matter.

According to an embodiment, PC 101 can be configured as a Web server that includes a portal application in accordance with an embodiment. More particularly, referring to FIG. 2, according to an embodiment, Web Application Server 200 is configured to enable programmers to use an applet 210 that runs on Web Application Server 200 as an applet interface for a portlet 220. Portlet 220 is configured to call an applet 210. FIG. 2 also illustrates a portlet container 230 that is configured to provide a canvas/graphic 240 on which an end user can draw. Portlet/Applet Interface 240 is configured as a canvas that operates to allow a user to pass mouse coordinates by tracking where a user might click, for example, which is passed to a server to allow the server-side Applet to respond via an Applet API. The Applet API thereby creates a graphical portlet. In one embodiment, the graphic that is provided SVG based so that SVG tags are generated in the returning web page.

Portlet container 230 can be configured to be operable with a Java™ Archive (JAR) file 250. The JAR format file 250 enables a user to store a bundle of multiple files in a single archive file. JAR file 250 is configured to contain the class files and auxiliary resources associated with applets and applications according to the present invention. JAR file 250 can allow a user to digitally sign the contents of a JAR file.

According to an embodiment, an applet 210 is bundled in JAR file 250, the applet's class files and associated resources are downloaded to a browser in a single HTTP transaction. JAR file format 250 defines the packaging for extensions to enable adding functionality. Packages stored in JAR files can be optionally sealed so that the package can enforce version consistency. Sealing a package within a JAR file provides that all classes defined in that package are found in the same JAR file. Prior solutions required a user to access a web page with an APPLET encoded in a JAR file (web page), which has an APPLET tag. The web page is read by the browser. The JAR file is downloaded to the browser cache and executed within the browsers sandbox to prevent alteration of any files on a browser machine.

An embodiment provides that portlet/applet interface 240 is configured as an applet API to be operable with applet 210 and work with Web browsers. An Applet API according to embodiments herein can be provided by a java.applet package for Applet class and AppletContext interfaces. Applet API 240 can be configured to allow loading of data files specified relative to the URL of the applet or the page in which it is running; display short status strings; enable document display on a browser; find other applets; play sounds; and retrieve parameters specified by a user in an <APPLET> tag. Thus, an embodiment allows a portlet portlet programmer to choose the APPLET API when writing a portlet application via a Portlet-to-Applet interface adapter. The adapter can be configured to provide a graphic to the applet for use in drawing on by the programmer.

For example, when a paint( ) method is done, the adapter converts the data to a .JPG or .SVG and ships it back to the browser window for display with the other portlet content. Thus, the portlet-applet is running on Application Web Server 200 and not on a browser's computer.

More particularly, Applet API 240 further enables a portlet 220 to receive user actions and pass them onto Applet 210 and provide an interactive graphic. In response, Applet 210 performs the drawing according to a paint method or other appropriate method for drawing. Applet 210 exits the drawing method to enable portlet 220 to return everything generated to the user. Thus, Applet API 240 functions to map portlet methods to the Applet 210 methods.

Figure 3:
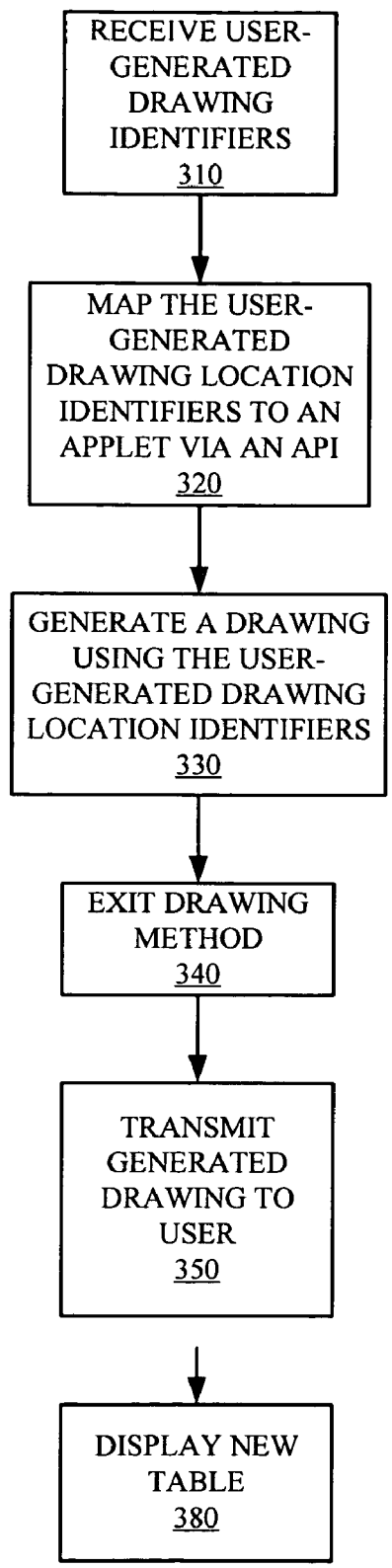
FIG. 3 is a flow diagram illustrating a method in accordance with an embodiment of the present invention.

Referring now to FIG. 3, a flow diagram illustrates a method according to an embodiment. Block 310 provides for receiving at a portlet, user-generated drawing location identifiers, which could be mouse clicks, taps, tablet PC drawing indications via a pen or the like. Block 320 provides for mapping the user-generated drawing location identifiers to an applet function via an Applet API within a JAR file. Block 330 provides for generating a drawing using the user-generated drawing location identifiers. Block 340 provides for exiting a drawing method in the applet. Block 350 provides for transmitting the generated drawing to a user.

In one embodiment, a portal website can be configured to employ multiple portlets that can be used to provide portions of web pages. According to the embodiment, a custom portlet is configured as an Applet API to enable users to draw on a user viewable graphic area via a method, such as an Applet.paint( ) method. The website can be configured according to the embodiment, to provide a portlet adapter to remap a portlet API to the Applet API so that the applet would be able to run within the portal environment. Thus, when a user uploads data from a client machine, the data flows to the portal server, and from the portal server to the portlet, and from portlet to the enclosed applet.

Once the applet receives user input data, the Applet can draw on a graphic. The portlet can then save the graphic in a JPG file or other appropriate file format. Thereafter, the portlet can be configured to transmit a Universal Resource Locator (URL) for the web page that contains the .JPG file or, for example, a .SVG drawing command based file. The portal server can be configured to combine the portlet web pages together and transmit the combined Web page to the user.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified steps performed in the same or a different order.

I claim:

1. A computer-implemented method for enabling dynamic graphical interfacing with a server from a client, the method comprising:

receiving at a portlet, a plurality of user-generated drawing location identifiers;

mapping the user-generated drawing location identifiers to an Applet function via an Applet application programming interface (API);

generating a drawing using a drawing method with the user-generated drawing location identifiers; and returning the generated drawing to a user associated with the user-generated drawing location identifiers;

wherein the user-generated drawing location identifiers are one or more of mouse clicks, taps, and tablet PC drawing indications via a pen;

wherein the portlet enables a graphical interface via the Applet API;

wherein the mapping includes mapping Applet methods to portlet methods; and wherein the Applet API enables multiple users to view the drawing without requiring local files.

* * * * *